Aug. 25, 1925.
O. G. SCHREIBER
1,551,060
VEHICLE SPRING EQUALIZER
Filed March 10, 1924          2 Sheets-Sheet 1
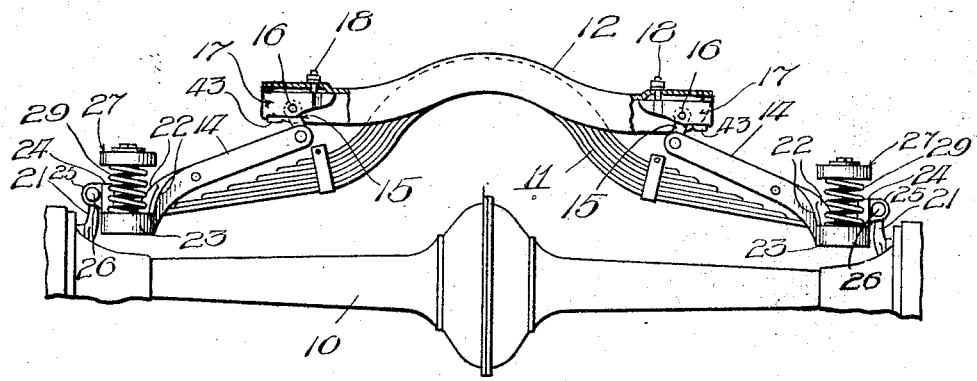
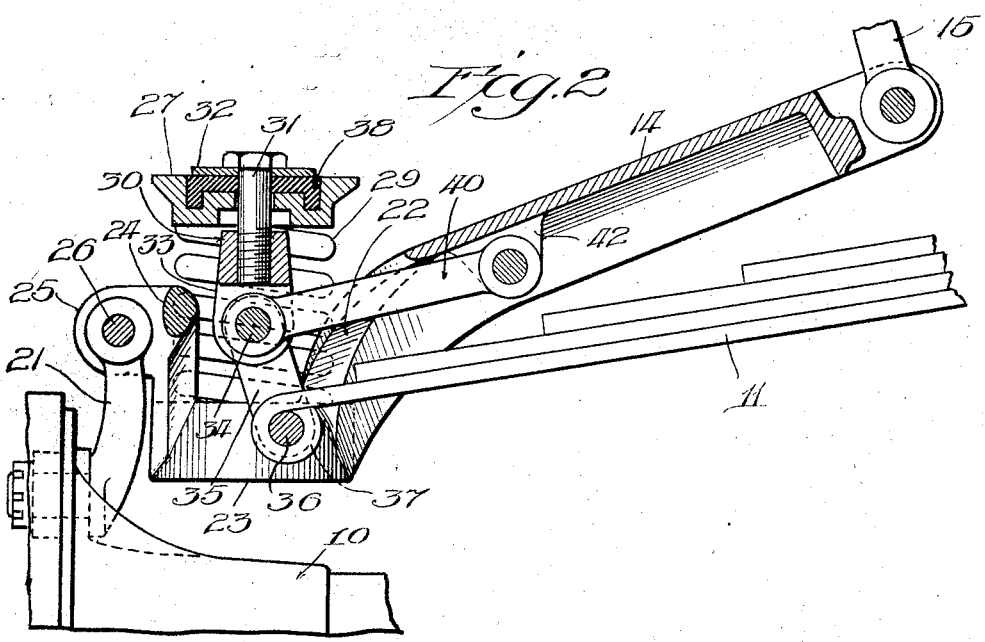
Inventor
Otto G. Schreiber Aug. 25, 1925.
O. G. SCHREIBER
1,551,060
VEHICLE SPRING EQUALIZER
Filed March 10, 1924    2 Sheets-Sheet 2
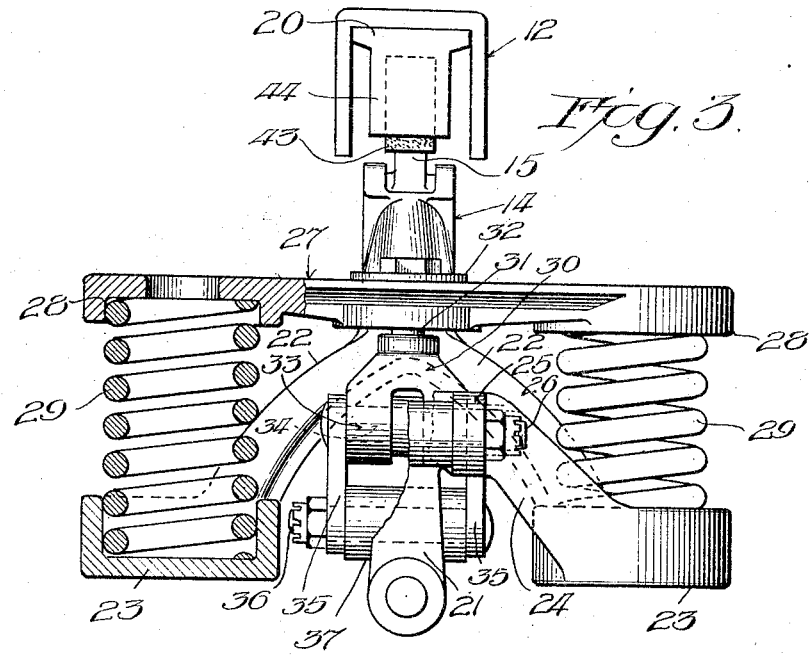
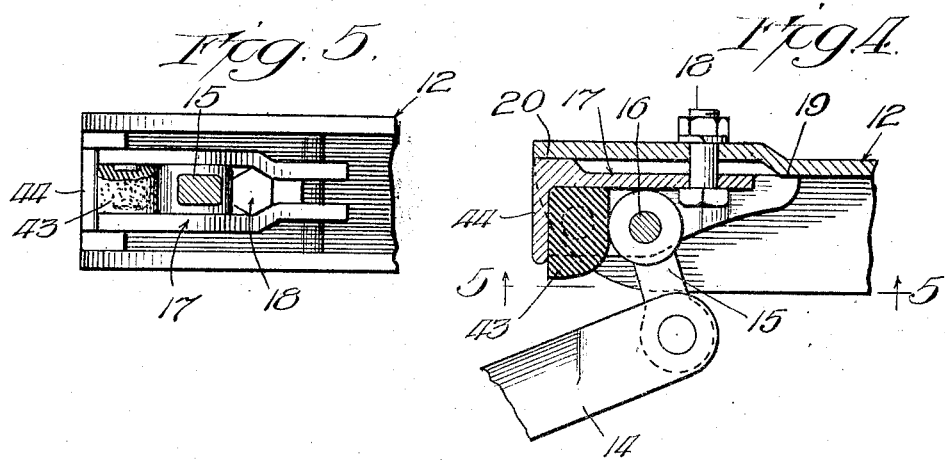
Inventor:
Otto G. Schreiber Patented Aug. 25, 1925.

1,551,060

UNITED STATES PATENT OFFICE.

OTTO G. SCHREIBER, OF COLOMA, MICHIGAN, ASSIGNOR TO AUTO SPECIALTIES MANUFACTURING COMPANY, OF ST. JOSEPH, MICHIGAN, A CORPORATION OF CALIFORNIA.

VEHICLE SPRING EQUALIZER.

Application filed March 10, 1924. Serial No. 698,029.

*To all whom it may concern:*

Be it known that I, OTTO G. SCHREIBER, a citizen of the United States, and a resident of Coloma, in the county of Berrien and State of Michigan, have invented certain new and useful Improvements in Vehicle Spring Equalizers; and I do hereby declare that the following is a full, clear, and exact description thereof, reference being had to the accompanying drawings, and to the characters of reference marked thereon, which form a part of this specification.

This invention relates to improvements in means for equalizing the action of springs for vehicles, and refers more particularly to an improved equalizer that is especially adapted for use with cross vehicle springs of the Ford type.

The present invention is adaptable to that type of equalizer which embraces a cantilever that is pivotally supported at one end on the axle assembly and is pivotally connected or shackled at its other end to a part of the vehicle subject to rebound, such as the body of the vehicle or a portion of the body frame, said lever carrying a spring or resilient element from which the main spring is hung, but may be adapted to equalizers of other types.

Equalizers of this character have heretofore been used with a single equalizer spring which yieldingly supports the main spring from the cantilever. Such equalizers have been practical for certain types of vehicles of given horizontal width dimensions, and in use with such prior types the equalizer springs were free to function in the space between the lower body side and the vehicle wheels. Owing to the practical fixed connection of the outer end of the cantilever with the axle assembly, inside of the vehicle wheel, it has been found that the prior equalizers are not adapted to wider bodies because of the likelihood of the upper ends of the equalizer springs contacting with and marring the lower sides of the body.

Attempts have been made to shorten the equalizer spring in order to adapt it to the reduced space between the body and wheel imposed by the widening of the body, but such shortening of the equalizer springs has not been found to be practical inasmuch as it lessened the range and smoothness of the equalizer spring action if the springs were made short enough to avoid contact with the body.

The primary object of the present invention is to produce an equalizer of this general character wherein the required length and resiliency of the equalizer springs can be preserved while at the same time lowering the equalizer, as a whole, relatively to the axle assembly and thereby permitting it to function without contact with the vehicle body.

In order to illustrate the principle of the invention I have shown in the drawings a practical embodiment of the invention, but it will be understood that the principle of the invention may be embodied in a construction differing in detail from that herein illustrated without sacrificing the advantages of the invention and within the scope of the appended claims.

As shown in the drawing:

Fig. 1 is a rear elevation of a spring of the Ford type, showing the axle assembly, and the application of my invention to the axle assembly, the spring, and a portion of the vehicle body.

Fig. 2 is an enlarged partial vertical section thereof.

Fig. 3 is an end view of the equalizer removed from the vehicle but showing the connection between it and the main spring of the vehicle.

Fig. 4 is a detail illustrating the manner of hanging the inner end of the cantilever from the vehicle body frame.

Fig. 5 is a section on the line 5—5 of Fig. 4, looking upwardly.

As shown in said drawings, 10 designates the rear axle assembly of a Ford type car, 11 the main rear spring thereof, and 12 the rear body cross frame member.

14, 14 designate levers which are pivoted to the axle assembly above the ends of the axle assembly and extend inwardly over and toward the center of said main spring, and are hung at their inner ends by means of shackles or hangers 15, 15 to the ends of the cross body member 12. As herein shown, the said hangers 15 are pivoted at their lower ends to the levers 14 and are pivoted at their upper ends to pins 16, which are supported in channel-shaped fittings 17, which are herein shown as adapted to fit within the outer ends of the channel-shaped cross body member 12. Said fittings are attached to said body member by bolts 18 which extend through the intermediate parts of the fittings, the fittings having upwardly facing bearings 19, 20 to engage the under face of the web of the channel cross member 12. Said cantilevers are pivoted at their outer ends to perches 21 fixed in any suitable manner to the axle assembly, the brake drum casing, as herein shown.

Said cantilevers, one at each end of the axle assembly, are alike in construction, and the description of one will be the description of the other, and reference hereinafter will be made to but one equalizer structure, except where the context indicates a plural relation.

The lever of each cantilever 14 is of hollow, downwardly opening channel cross section throughout the principal part of its length. Said lever is fashioned at its outer end to produce arch-shaped fork arms 22 on the outer ends of which are formed hollow, upwardly opening spring seats 23, the said spring seats being thus connected inwardly therebeyond by said fork arms. The said seats are also connected at their outer sides by an arch-shaped cross member 24 which is generally symmetrical in formation to the arch-shaped fork arms 22. The intermediate part of the outer arch-shaped cross member is formed to provide outwardly extending laterally spaced lugs or ears 25 to receive a bolt 26 which constitutes the pivotal connection between the perch 21 and the outer end of the cantilever as a whole.

27 designates a cross spring cap which extends horizontally above and intermediate the arch-shaped cross members and is formed at its outer ends with downwardly facing seats 28 which are above and oppose the seats 23. 29, 29 designate spiral compression springs which are interposed between and are seated at their lower and upper ends respectively in the spring seats 23 and 28.

30 designates a yoke below the central portion of the spring cap. It has an internally threaded bore to receive an adjusting screw 31 which extends downwardly through the cap plate, with its headed end bearing on a washer 32. The lower laterally spaced fork arms 33 of said yoke are provided with bearings to receive a cross pin 34. Said cross pin pivotally supports spring hangers or shackles 35, which latter are provided at their lower ends with bearing openings to receive a shackle or hanger pin 36 which extends through the eye 37 of the main spring 11. There are two of the hangers 35, one on each side of the main spring eye, and one of said hangers lies outside of each arm 33 of the yoke 30.

With this construction it will be seen that there is a connection between the central part of the spring cap and the end of the main spring, afforded through the yoke 30, bolt 31 and hanger 35,—the spring 11 being centralized with respect to the equalizer springs 29 and located below the cantilever arm 14. It will also be observed that the upwardly arched forks 23 and cross member 24 afford free movement of the hangers 35 on their pivot 34. It will also be seen that the downwardly curved connection between the spring seats 23 and the main body of the cantilever arm bring said spring seats below the end of the main spring 11, and therefore permits a desired length of equalizer spring 29 between the depressed spring seats 23 and the spring cap to give the desired resiliency or spring action to said equalizer springs. Moreover, the widening and downwardly curving of the cantilever arm produces, in connection with the spaced equalizer springs, a very stable construction which tends to compensate the actions of the equalizer springs while permitting one spring to flex differently from and relatively to the other spring when acting and co-acting stresses are imposed in a nonuniform way on said springs.

Preferably and as herein shown, the washer 32 against which the head of the screw bolt 31 bears, is seated upon and transmits stress to the spring cap through a yielding buffer element 38 made of rubber or like material, said buffer element being indicated as circular and having depending lips to interlockingly engage a circular recess at the center of the spring cap. This construction avoids metal to metal contact of the screw bolt 31 and its head with the spring cap and, therefore, avoids objectionable resonance in the connecting parts. The said buffer element 38 also serves to take the first and smaller vibrations transmitted to the equalizer springs before equalizing stresses are brought on the springs 29.

A radius link 40 is pivoted at its inner end to a pin 41 which is seated in lugs 42 within the channel-shaped arm 14 of the cantilever, and is pivoted at its outer end between the arms 33 of the yoke 30 by the same pivot pin 34 that pivotally connects the hangers 35 to said yoke. The function of said radius link is to fix the distance between the pivotal connection of said link with the cantilever arm and the yoke, and thereby limit side sway of the vehicle body supported on the main and equalizer springs.

A buffer element in the form of a rubber block 43 is inserted upwardly into the channel-shaped fitting 17 between the end wall 44 of said fitting and the hanger 15. Said buffer element extends below said wall 44 and is rounded on its inner side, or that remote from said wall. The function of said buffer element is to prevent metal to metal contact of the arm 14 with the fitting or with other metal parts of the body support to which the inner end of the cantilever arm is connected, both in the shock absorbing and recoil check action of the cantilever.

I claim as my invention:

1. An equalizer for vehicle springs comprising an inwardly and upwardly inclined lever arm adapted to be pivoted at one end to a part fixed relatively to the axle assembly and adapted for pivotal connection at its other end to a part of a vehicle subject to rebound, said arm embracing a transverse, arched member having laterally spaced spring seats offset wholly below the plane of the arm, equalizer springs supported on said seats, a cross spring cap bearing at its ends on said springs, and means intermediate the ends of said spring cap to suspend a main spring.

2. An equalizer for vehicle springs comprising an inwardly and upwardly inclined lever arm adapted to be pivoted at one end to a part fixed relatively to the axle assembly and adapted for pivotal connection at its other end to a part of a vehicle subject to rebound, said arm embracing a transverse, arched member having laterally spaced spring seats offset below the plane of the arm, equalizer springs supported on said seats, a cross spring cap bearing at its ends on said springs, and means intermediate the ends of said spring cap to suspend a main spring, including means acting through said cap to adjust the tension of said equalizer springs.

3. An equalizer for vehicle springs comprising an inwardly and upwardly inclined lever arm adapted to be pivoted at one end to a part fixed relatively to the axle assembly and adapted for pivotal connection at its other end to a part of a vehicle subject to rebound, said arm embracing a transverse, arched member having laterally spaced spring seats offset below the plane of the arm, equalizer springs supported on said seats, a cross spring cap bearing at its ends on said springs, means intermediate the ends of said spring cap to suspend a main spring, and a radius link pivoted at one end to said arm and pivoted at its other to said main spring suspending means.

4. An equalizer for vehicle springs comprising an inwardly and upwardly inclined lever arm adapted at its ends for pivotal connection to a part of the vehicle subject to rebound and to a vehicle axle assembly, said latter end being transversely widened and having downwardly offset spring seats spaced across the vertical plane of said arm, a cap plate, and equalizer springs between the ends of said cap plate and said seats.

5. An equalizer for vehicle springs comprising an inwardly and upwardly inclined lever arm adapted at its ends for pivotal connection to a part of the vehicle subject to rebound and to a vehicle axle assembly, said latter end being transversely widened and having downwardly offset spring seats spaced across the vertical plane of said arm, a spring cap, equalizer springs between the ends of said spring cap and said seats, and main spring suspending means fixed to and intermediate the ends of said cap.

6. An equalizer for vehicle springs comprising an inwardly and upwardly inclined lever arm adapted at its ends for pivotal connection to a part of the vehicle subject to rebound and to a vehicle axle assembly, said latter end being transversely widened and having downwardly offset spring seats spaced across the vertical plane of said arm, a spring cap, equalizer springs between the ends of said spring cap and said spring seats, a yoke depending from said spring cap intermediate the ends of said cap, and hangers pivoted to said yoke and adapted to support a main spring.

7. An equalizer for vehicle springs comprising an inwardly and upwardly inclined lever arm adapted at its ends for pivotal connection to a part of the vehicle subject to rebound and to a vehicle axle assembly, said latter end being transversely widened and having downwardly offset spring seats spaced across the vertical plane of said arm, a spring cap, equalizer springs between the ends of said spring cap and said spring seats, a main spring suspending yoke shorter than the springs depending from and connected intermediate the ends of said cap and a radius link pivoted at one end to said yoke and at its other end to said arm.

8. An equalizer for vehicle springs comprising an inwardly and upwardly inclined lever arm adapted at its ends for pivotal connection to a part of the vehicle subject to rebound and to a vehicle axle assembly, said latter end being transversely widened and having downwardly offset spring seats spaced across the vertical plane of said arm, a spring cap, equalizer springs between the ends of said spring cap and said seats, a yoke having means to suspend a main spring hanger therefrom, and a bolt threaded into said yoke and extending through said cap intermediate the ends of the latter and supported on said spring cap.

9. An equalizer for vehicle springs comprising an inwardly and upwardly inclined lever arm adapted at its ends for pivotal connection to a part of the vehicle subject to rebound and to a vehicle axle assembly, said latter end being transversely widened and having downwardly offset spring seats spaced across the vertical plane of said arm, a spring cap, equalizer springs between the ends of said spring cap and said seats, a yoke suspended from said spring cap between the ends of the latter, a pin extending through the arms of said yoke to support main spring hangers and a radius link pivoted at one end to said yoke and at its other end to said arm.

10. An equalizer for vehicle springs comprising an inwardly and upwardly inclined lever arm adapted at its ends for pivotal connection to a part of the vehicle subject to rebound and to a vehicle axle assembly, said latter end being transversely widened and having downwardly offset spring seats spaced across the vertical plane of said arm, a spring cap, equalizer springs between the ends of said spring cap and said seats, a yoke having means to suspend a main spring hanger therefrom, a bolt threaded to said yoke and extending upwardly through and headed above said spring cap, and a cushioning element between the head of said bolt and said cap.

11. In an equalizer for vehicle springs, a single lever arm curved downwardly at its outer end and formed with spring seats offset below and spaced laterally across said arm, said seats lying in a plane that is intersected by a longitudinal line in the arm extended outwardly beyond the curved end.

12. In an equalizer for vehicle springs, a lever arm provided at its outer end with downturned, flaring, arched forks, and with equalizer spring seats spaced across the vertical plane of said arm, said seats lying in a plane that is intersected by a longitudinal line in the arm extended outwardly beyond the curved end.

13. In an equalizer for vehicle springs, a lever arm provided at its outer end with downturned, flaring, arched forks terminating in equalizer spring seats spaced across the vertical plane of said arm, and an outer arched cross member extending between and connected to said spring seats.

14. In an equalizer for vehicle springs, a lever arm provided at its outer end with downturned, flaring, arched forks, and with equalizer spring seats spaced across the vertical plane of said arm, and an outer arched cross member extending between and connected to said spring seats, said outer arched member being provided with a pivot part.

15. In an equalizer for vehicle springs, a lever arm provided at its outer end with downturned, flaring arched forks, and with upwardly facing equalizer spring seats spaced across the vertical plane of said arm, and an outer arched cross member extending between and connected to said spring seats, combined with a transverse spring cap intermediate said arched portions of said arms, and equalizer springs interposed between said spring seats and the ends of said spring cap.

16. In an equalizer for vehicle springs, a lever arm provided at its outer end with downturned, flaring, arched forks, and with upwardly facing equalizer spring seats spaced across the vertical plane of said arm, and an outer arched cross member extending between and connected to said spring seats, combined with a transverse spring cap intermediate said arched portions of said arms, equalizer springs interposed between said spring seats and the ends of said spring cap, and a main spring supporting member suspended from, and between the ends of, said spring cap.

17. The combination with the main spring of a vehicle, its axle assembly and a vehicle part subject to rebound relatively to said axle assembly, of a lever arm connected at one end to said part subject to rebound and pivoted at its other end to said axle assembly, said lever arm being provided with spring seats spaced laterally across, and offset below, said main spring end, a spring cap, equalizer springs seated on said spring seats and engaging at their upper ends the ends of said spring cap, and a connection between the intermediate part of said cap and an end of said main spring.

18. The combination with the main spring of a vehicle, its axle assembly and a vehicle part subject to rebound relatively to said axle assembly, of a lever arm connected at one end to said part subject to rebound and pivoted at its other end to said axle assembly, said lever arm being provided with spring seats spaced laterally across, and offset below, said main spring end, a spring cap, equalizer springs seated on said spring seats and engaging at their upper ends the ends of said spring cap, a connection between the intermediate part of said cap and an end of said main spring, and a radius link pivotally connected between said connection and said arm inwardly beyond said connectors.

19. In an equalizer for vehicle springs, a lever arm provided at its outer end with downwardly turned flaring arched forks terminating in equalizer spring seats spaced across the vertical plane of said arm, springs resting on said seats, a spring cap resting on said springs, and a suspension for the end of a vehicle spring depending from said cap and lying wholly above the lowermost points of the down turned portions of said arm.

20. The combination with the main spring of a vehicle, its axle assembly and a vehicle part subject to rebound relatively to said axle assembly, the lever arm connected at one end to said part and pivoted at its other end to said axle assembly, said arm being divided near the latter end into two members comprising a fork and there being horizontal spring seats at the end of said fork, springs resting on said seats, a spring cap resting on the springs, the end of the vehicle spring extending through said fork to a point between the equalizer springs, and a suspending means for the end of said vehicle spring depending from said cap.

In witness whereof I claim the foregoing as my invention, I hereunto append my signature this 28th day of February, 1924.

OTTO G. SCHREIBER.